United States Patent
Fauconnet

(10) Patent No.: US 10,906,780 B2
(45) Date of Patent: Feb. 2, 2021

(54) ABSORBER FOR ELEVATOR SYSTEM RAIL

(71) Applicant: Otis Elevator Company, Farmington, CT (US)

(72) Inventor: Aurélien Fauconnet, Isdes (FR)

(73) Assignee: OTIS ELEVATOR COMPANY, Farmington, CT (US)

(*) Notice: Subject to any disclaimer, the term of this patent is extended or adjusted under 35 U.S.C. 154(b) by 463 days.

(21) Appl. No.: 15/748,004

(22) PCT Filed: Jul. 27, 2015

(86) PCT No.: PCT/IB2015/001307
§ 371 (c)(1),
(2) Date: Jan. 26, 2018

(87) PCT Pub. No.: WO2017/017486
PCT Pub. Date: Feb. 2, 2017

(65) Prior Publication Data
US 2018/0215583 A1    Aug. 2, 2018

(51) Int. Cl.
*B66B 7/02* (2006.01)
*B66B 5/28* (2006.01)
(Continued)

(52) U.S. Cl.
CPC ........... *B66B 7/025* (2013.01); *B66B 5/282* (2013.01); *B66B 9/00* (2013.01); *F16F 9/19* (2013.01);
(Continued)

(58) Field of Classification Search
CPC .... B66B 7/025; B66B 5/282; F16F 2230/007; F16F 2230/06; F16F 9/19
See application file for complete search history.

(56) References Cited

U.S. PATENT DOCUMENTS 4,635,907 A    1/1987    Bialy et al.
5,553,686 A *  9/1996    Jensen .................. B66B 19/002
                                                              187/408
(Continued)

FOREIGN PATENT DOCUMENTS

CN    2725249 Y    9/2005
CN    201873409 U    6/2011
(Continued)

OTHER PUBLICATIONS

Chinese Office Action Issued in CN Application No. 201580081989.6, dated Mar. 1, 2019, 5 Pages.
(Continued)

*Primary Examiner* — Diem M Tran
(74) *Attorney, Agent, or Firm* — Cantor Colburn LLP

(57) ABSTRACT

An elevator system includes a hoistway, the hoistway having a plurality of landing floors each landing floor having a landing floor door. One or more guide rails are located in the hoistway to guide one or more elevator system components along the hoistway. An absorber is located at a hoistway pit and is supportive of a guide rail of the one or more guide rails. The absorber is configured to absorb loads imparted to the guide rail due to vertical translation and/or compression of the hoistway. A method of supporting a guide rail of an elevator system includes locating an absorber in an elevator hoistway in operable communication with a guide rail of an elevator system. Vertically-acting loads are transmitted from the guide rail to the absorber via the absorber piston thereby increasing a fluid pressure in the housing chamber.

16 Claims, 5 Drawing Sheets

(51) Int. Cl.
*B66B 9/00* (2006.01)
*F16F 9/19* (2006.01)
*F16F 9/43* (2006.01)

(52) U.S. Cl.
CPC ...... *F16F 9/435* (2013.01); *F16F 2230/0005* (2013.01); *F16F 2230/007* (2013.01); *F16F 2230/06* (2013.01)

(56) References Cited

U.S. PATENT DOCUMENTS

| | | | |
|---|---|---|---|
| 5,653,311 | A | 8/1997 | Heikkinen et al. |
| 6,431,322 | B1 | 8/2002 | Rossman et al. |
| 2011/0186387 | A1* | 8/2011 | Schwendenmann .... B66B 7/025 187/408 |
| 2013/0233654 | A1 | 9/2013 | Cao et al. |

FOREIGN PATENT DOCUMENTS

| | | | | |
|---|---|---|---|---|
| CN | 102774723 | A | | 11/2012 |
| CN | 204280967 | U | | 4/2015 |
| EP | 0687645 | A3 | | 7/1996 |
| ES | 2342805 | A1 | | 7/2010 |
| JP | 2001106455 | | | 4/2001 |
| JP | 2003182953 | A | * | 7/2003 ............. B66B 7/025 |
| JP | 2005126217 | A | * | 5/2005 ............. B66B 7/025 |
| JP | 2006160413 | A | * | 6/2006 ............. B66B 7/025 |
| JP | 2010116231 | A | | 5/2010 |
| JP | 2010163056 | A | | 7/2010 |
| WO | 2007070208 | A2 | | 6/2007 |
| WO | 2008071831 | A1 | | 6/2008 |
| WO | 2011095493 | A1 | | 8/2011 |

OTHER PUBLICATIONS

International Search Report for International Application No. PCT/IB2015/001307; International Filing Date Jul. 27, 2015; dated May 3, 2016; 5 Pages.

Written Opinion for International Application No. PCT/IB2015/001307; International Filing Date Jul. 27, 2015; dated May 3, 2016; 7 Pages.

* cited by examiner

ABSORBER FOR ELEVATOR SYSTEM RAIL

CROSS REFERENCE TO RELATED APPLICATIONS

This application is a National Stage application of PCT/IB2015/001307, filed Jul. 27, 2015, the entire contents of which are hereby incorporated by reference.

BACKGROUND

The subject matter disclosed herein relates to elevator systems. More particularly, the present disclosure relates to guide rail structures and support for elevator systems.

In current, typical elevator systems, guide rails secured in the hoistway are utilized to guide elevator cars and/or counterweights along the hoistway. The guide rails are secured to the hoistway wall via guide rail brackets. The guide rails are sized to withstand loads from normal elevator system operation, from safety brake actuation at car or counterweight rail, from building settling and the like. In the case of building settling, the guide rails must remain supported by the guide rail brackets while not buckling during the settling. Recent changes in elevator systems standards by governing bodies have introduced new requirements requiring that, in elevator systems having a rise of 40 meters or higher, push through forces at all brackets along the guide rail length, as opposed to at a single guide rail bracket, must be taken into account when sizing the guide rails. This would have the effect of increasing the necessary rail size in the elevator systems, which also increases cost. Thus a solution to meet the necessary standard requirements while not significantly increasing rail size or system cost is desired.

BRIEF SUMMARY

In one embodiment, an elevator system includes a hoistway, the hoistway having a plurality of landing floors each landing floor having a landing floor door. One or more guide rails are located in the hoistway to guide one or more elevator system components along the hoistway. An absorber is located at a hoistway pit and is supportive of a guide rail of the one or more guide rails. The absorber is configured to absorb loads imparted to the guide rail due to vertical translation and/or compression of the hoistway.

Additionally or alternatively, in this or other embodiments the absorber includes an absorber housing, and an absorber piston located in the absorber housing, and together with the absorber housing defining a housing chamber containing a volume of fluid. The absorber piston includes a piston upper surface interactive with the guide rail wherein relative motion of the guide rail relative to the pit floor increases fluid pressure in the housing chamber.

Additionally or alternatively, in this or other embodiments a pressure relief valve periodically releases fluid from the housing chamber, thereby reducing a stroke of the absorber piston in the absorber housing.

Additionally or alternatively, in this or other embodiments a fluid collector is operably connected to the pressure relief valve to collect the fluid released from the housing chamber via the pressure relief valve.

Additionally or alternatively, in this or other embodiments the pressure relief valve releases fluid from the housing chamber when a fluid pressure in the housing chamber exceeds a selected threshold.

Additionally or alternatively, in this or other embodiments the absorber piston includes a recess in the piston upper surface receptive of the guide rail.

Additionally or alternatively, in this or other embodiments the one or more guide rails are at least two guide rails.

Additionally or alternatively, in this or other embodiments the one or more elevator system components include an elevator car and/or an elevator system counterweight.

In another embodiment, an absorber for an elevator system guide rail includes an absorber housing and an absorber piston located in the absorber housing, which together with the absorber housing defines a housing chamber containing a volume of fluid. The absorber piston includes a piston upper surface interactive with a guide rail of an elevator system, wherein relative motion of the guide rail relative to a hoistway pit floor increases fluid pressure in the housing chamber. The absorber is configured to absorb loads imparted to the guide rail due to vertical translation and/or compression of a hoistway of the elevator system.

Additionally or alternatively, in this or other embodiments a pressure relief valve periodically releases fluid from the housing chamber, thereby reducing a stroke of the absorber piston in the absorber housing.

Additionally or alternatively, in this or other embodiments a fluid collector is operably connected to the pressure relief valve to collect the fluid released from the housing chamber via the pressure relief valve.

Additionally or alternatively, in this or other embodiments the pressure relief valve releases fluid from the housing chamber when a fluid pressure in the housing chamber exceeds a selected threshold.

Additionally or alternatively, in this or other embodiments the absorber piston includes a recess in the piston upper surface receptive of the guide rail.

In yet another embodiment, a method of supporting a guide rail of an elevator system includes locating an absorber in an elevator hoistway in operable communication with a guide rail of an elevator system. The absorber includes an absorber housing, an absorber piston located in the absorber housing defining a housing chamber containing a volume of fluid. Vertically-acting loads are transmitted from the guide rail to the absorber via the absorber piston thereby increasing a fluid pressure in the housing chamber.

Additionally or alternatively, in this or other embodiments fluid is periodically released from the housing chamber via opening of a pressure relief valve, and a stroke of the absorber piston in the absorber housing is thereby reduced.

Additionally or alternatively, in this or other embodiments the fluid is released from the housing chamber via opening of the pressure relief valve when a fluid pressure in the housing chamber exceeds a first threshold.

Additionally or alternatively, in this or other embodiments the pressure relief valve is closed when the fluid pressure in the housing chamber falls below a second threshold.

Additionally or alternatively, in this or other embodiments the first threshold is substantially equal to the second threshold.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
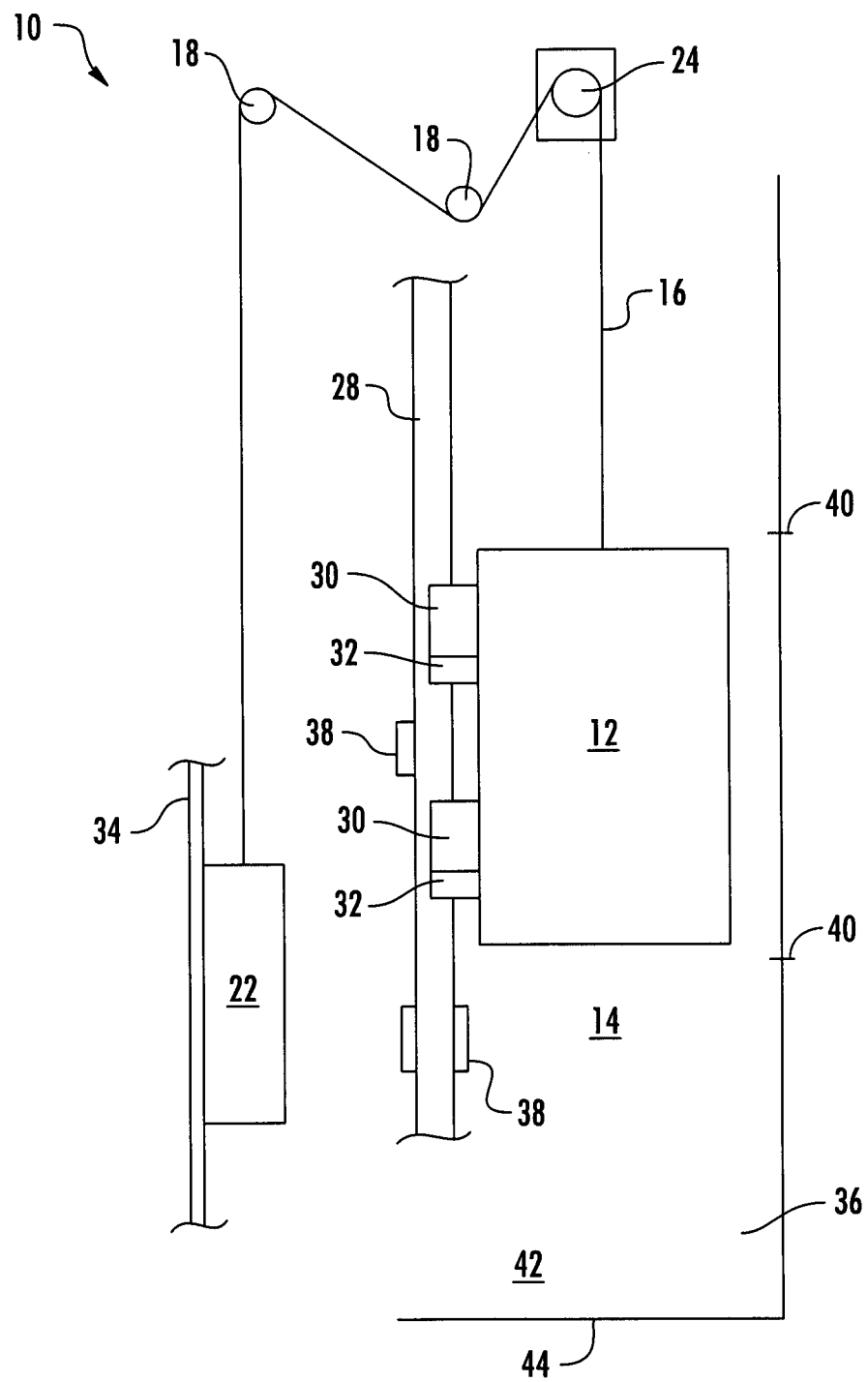
FIG. 1 is a schematic view of an embodiment of an elevator system.

Shown in FIG. 1 is a schematic of an exemplary elevator system 10. The elevator system 10 includes an elevator car 12 operatively suspended or supported in a hoistway 14 with one or more suspension members 16, such as ropes or belts. The one or more suspension members 16 interact with one or more sheaves 18 to be routed around various components of the elevator system 10. The one or more sheaves 18 could also be connected to a counterweight 22, which is used to help balance the elevator system 10 and reduce the difference in suspension member 16 tension on both sides of a traction sheave 24 during operation.

The elevator system 10 further includes one or more car guide rails 28 to guide the elevator car 12 along the hoistway 14. The elevator car 12 includes one or more guide shoes or rollers 30 interactive with the car guide rails 28 to guide the elevator car 12. The elevator car 12 also may include safeties 32 interactive with the car guide rail 28 to slow and/or stop motion of the elevator car 12 under certain conditions, such as an overspeed condition. Further, the elevator system 10 includes one or more counterweight guide rails 34 to guide the counterweight 22 along the hoistway 14. Car guide rails 28 and counterweight guide rails 34 are installed to hoistway walls 36 using a plurality of guide rail brackets 38, which in some embodiments are located along the hoistway walls 36 at intervals of about 3 meters between guide rail brackets 38.

The hoistway 14 includes one or more landing floors 40 at which the elevator car 12 stops to allow ingress and/or egress of passengers from the elevator car 12 through elevator car doors (not shown). Below the lowest landing floor 40 of the hoistway 14, the hoistway 14 terminates in a pit 42, including a pit floor 44. After construction of the building and installation of the elevator system 10, some settling or vertical compression of the building typically occurs, especially in buildings having a larger rise. The settling can result in undesired effects on the guide rails of the elevator system 10, such as shifting or buckling due to relative movement of the guide rail brackets 38 and guide rails 28, 34. Further, the settling imparts forces on the guide rails 28, 34 at the guide rail brackets 38 which dictate sizing of the guide rails 28, 34 to withstand such forces.

Figure 2:
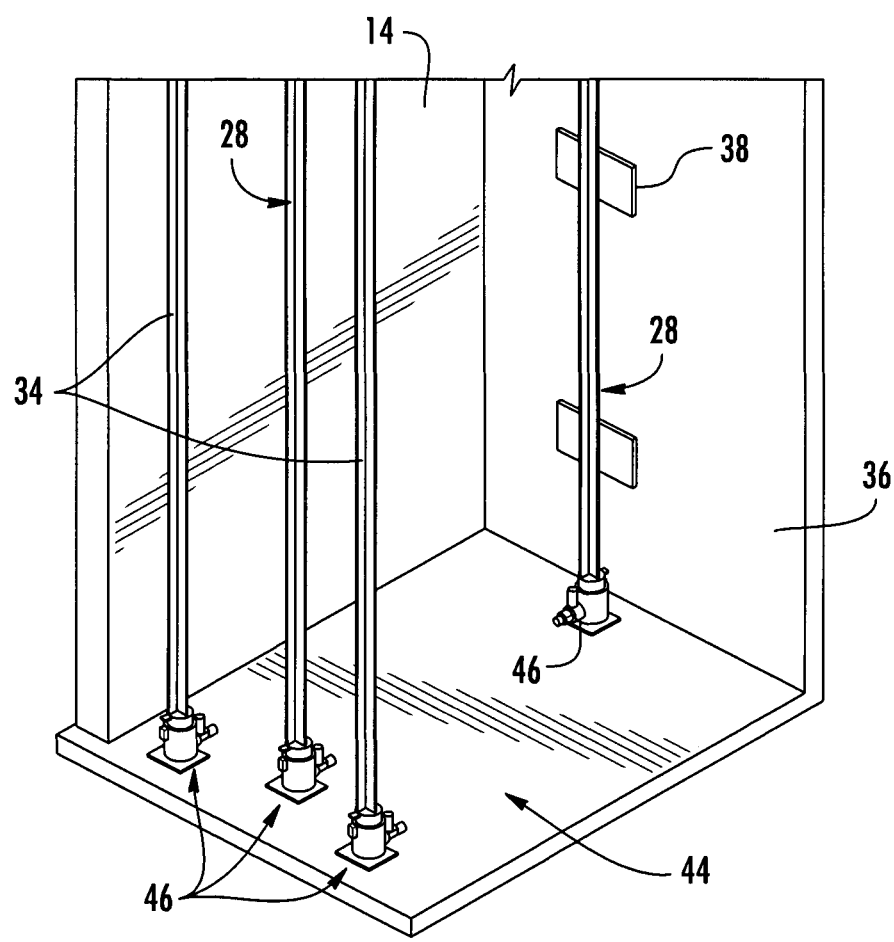
FIG. 2 is a perspective view of a portion of a hoistway of an embodiment of an elevator system.

Referring now to FIG. 2, to alleviate forces acting on the guide rails 28, 34, and the guide rail brackets 38, each guide rail 28, 34 terminates at an absorber 46 located at the pit floor 44. The absorber 46 is configured to absorb the effect of building settling, allowing the guide rails 28, 34 to reposition themselves downwardly relative to the pit floor 44 as the building settles, so that in effect, the guide rails 28, 34 move with the guide rail brackets 38 fixed to the hoistway walls 36. This reduces the relative forces between the guide rails 28, 34 and the guide rail brackets 38.

Figure 3:
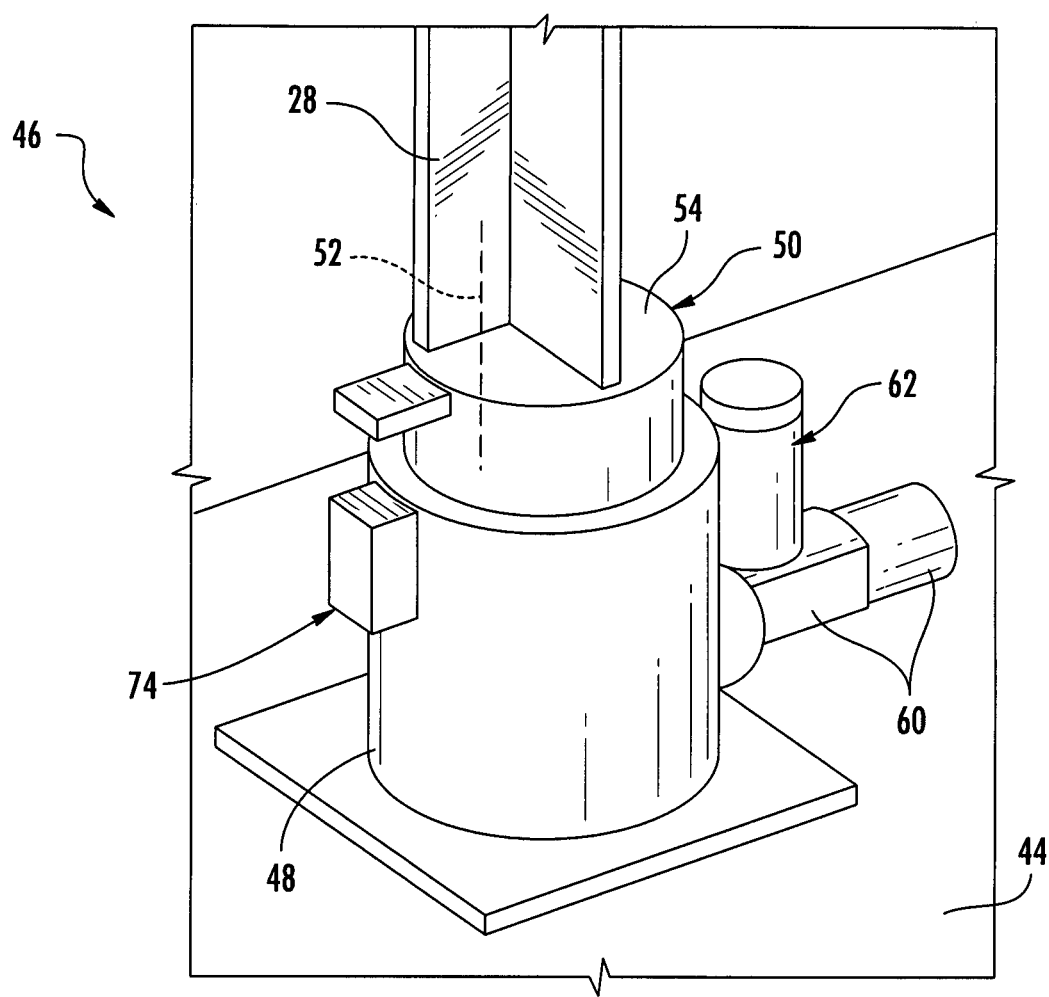
FIG. 3 is a perspective view of an embodiment of an absorber for an elevator system.
Figure 4:
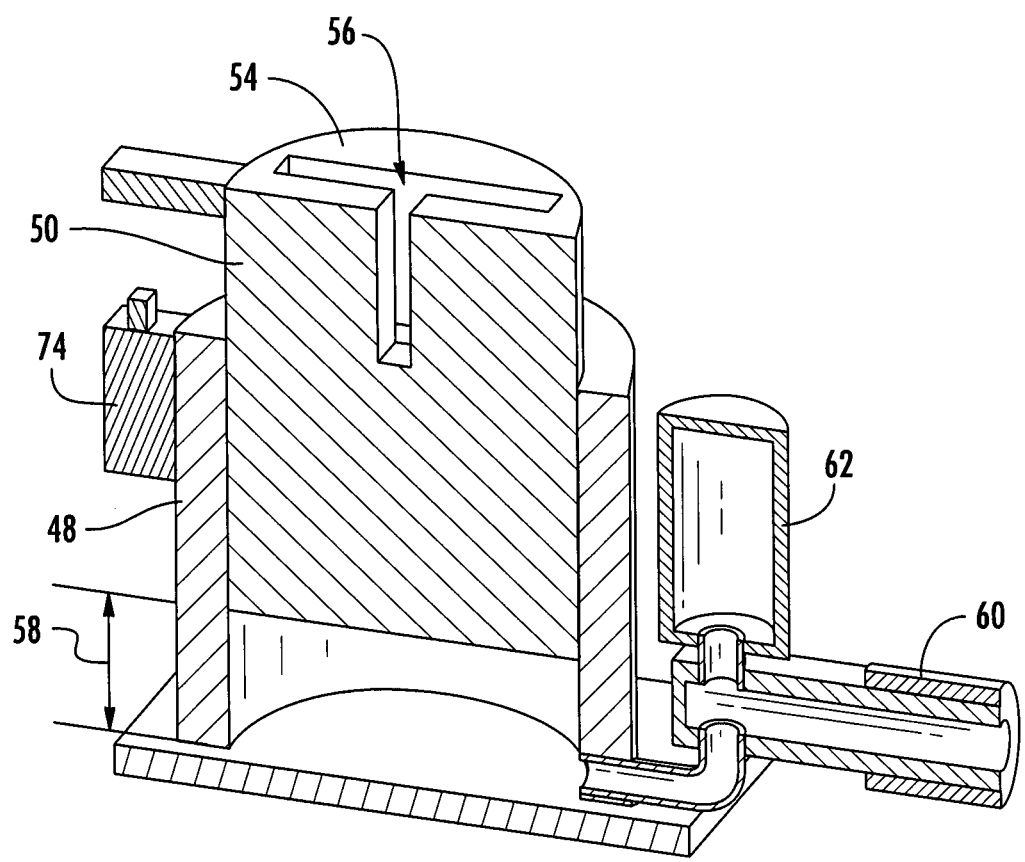
FIG. 4 is a cross-sectional view of an embodiment of an absorber for an elevator system.

Referring now to FIGS. 3 and 4, an embodiment of an absorber 46 is illustrated. The absorber 46 includes an absorber housing 48 with a movable absorber piston 50 located in the absorber housing 48 and movable along a stroke axis 52. As shown in FIG. 3, the guide rail 28, 34 rests at an upper piston surface 54. In some embodiments, as shown in FIG. 4, the absorber piston 50 includes a rail recess 56 in which the guide rail 28, 34 may be positioned. The absorber housing 48 and absorber piston 50 define a housing chamber 58 in the absorber housing 48. The housing chamber 58 is pressurized with a volume of oil or other fluid medium. A pressure relief valve 60 and an oil collector tank 62 are fluidly connected to the housing chamber 58.

At initial installation, the absorber piston 50 is positioned at its maximum position along the stroke axis 52, maximizing the housing chamber 58 volume. As the building settles, the guide rail 28, 34 imparts a downward force on the upper piston surface 54, thus increasing a pressure on the fluid in the housing chamber 58. Once the fluid pressure builds to a first threshold, the pressure relief valve 60 opens, releasing a volume of fluid from the housing chamber 58 into the oil collector tank 62 and allowing the absorber piston 50 to travel downwardly along the stroke axis 52. Once a sufficient volume of fluid is released from the housing chamber 58 such that the fluid pressure is reduced to below a second threshold, the pressure relief valve 60 closes, thus stopping travel of the absorber piston 50. In some embodiments, the first threshold is substantially equal to the second threshold. In some embodiments, the pressure relief valve 60 has a time delay feature in order to not retract the absorber piston 50 during elevator car 12 or counterweight 22 safety actuation. These events may also increase fluid pressure in the housing chamber 58, but are very short time duration events compared to building settling.

Figure 5:
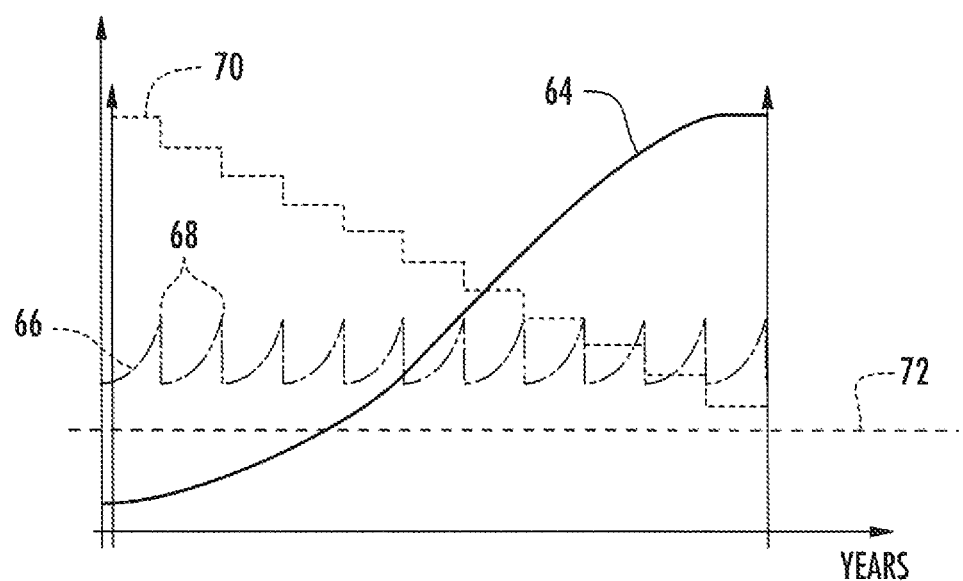
FIG. 5 is a graphical representation of operation of an absorber for an elevator system.

As illustrated in FIG. 5, this operation is repeated over time as the building settles further, in some instances over about the first ten years after building construction. As the building settles, represented by curve 64, fluid pressure 66 in the housing chamber 58 increases until pressure relief valve 60 is opened at point 68, dropping the fluid pressure and retracting the absorber piston 50, shown at 70. With each periodic opening of the pressure relief valve 60, the absorber piston 50 is retracted further, until it reaches a minimum stroke point 72, at which a safety switch 74 (shown in FIG. 3, 4) is triggered stopping operation of the absorber 46 and will alert to service people to readjust the guide rails 28, 34 and reset the absorbers 46.

Utilizing the absorbers 46 absorbs forces that would typically be transferred into the guide rails 28, 34 during building settling. This allows for the guide rail 28, 34 configuration to be constrained by other factors such as loads during safety operations, not loads from building settling. Thus, the guide rails 28, 34 can often be formed of more lightweight materials, at a considerable cost savings. Further, the absorbers 46 reduce the risk of guide rail buckling or other deformation to the guide rails 28, 34 and/or guide rail brackets 38.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:
a hoistway, the hoistway having a plurality of landing floors each landing floor having a landing floor door;
one or more guide rails disposed in the hoistway to guide one or more elevator system components along the hoistway; and
an absorber disposed at a hoistway pit floor and supportive of a guide rail of the one or more guide rails, the absorber configured to absorb loads imparted to the guide rail due to vertical translation and/or compression of the hoistway;
wherein the absorber includes:
an absorber housing; and
an absorber piston disposed in the absorber housing, together with the absorber housing defining a housing chamber containing a volume of fluid, the absorber piston including a piston upper surface interactive with the guide rail, the guide rail resting at the piston upper surface;
wherein relative motion of the guide rail relative to the pit floor increases fluid pressure in the housing chamber.

2. The elevator system of claim 1, further comprising a pressure relief valve to periodically release fluid from the housing chamber, thereby reducing a stroke of the absorber piston in the absorber housing.

3. The elevator system of claim 2, further comprising a fluid collector operably connected to the pressure relief valve to collect the fluid released from the housing chamber via the pressure relief valve.

4. The elevator system of claim 2, wherein the pressure relief valve releases fluid from the housing chamber when a fluid pressure in the housing chamber exceeds a selected threshold.

5. The elevator system of claim 1, wherein the absorber piston includes a recess in the piston upper surface receptive of the guide rail.

6. The elevator system of claim 1, wherein the one or more guide rails are at least two guide rails.

7. The elevator system of claim 1, wherein the one or more elevator system components include an elevator car and/or an elevator system counterweight.

8. An absorber for an elevator system guide rail comprising:
an absorber housing;
an absorber piston disposed in the absorber housing, together with the absorber housing defining a housing chamber containing a volume of fluid, the absorber piston including a piston upper surface interactive with a guide rail of the elevator system;
wherein relative motion of the guide rail relative to a hoistway pit floor increases fluid pressure in the housing chamber, the absorber configured to absorb loads imparted to the guide rail due to vertical translation and/or compression of a hoistway of the elevator system; and
a pressure relief valve to periodically release fluid from the housing chamber, thereby reducing a stroke of the absorber piston in the absorber housing.

9. The absorber of claim 8, further comprising a fluid collector operably connected to the pressure relief valve to collect the fluid released from the housing chamber via the pressure relief valve.

10. The absorber of claim 8, wherein the pressure relief valve releases fluid from the housing chamber when a fluid pressure in the housing chamber exceeds a selected threshold.

11. The absorber of claim 8, wherein the absorber piston includes a recess in the piston upper surface receptive of the guide rail.

12. A method of supporting a guide rail of an elevator system comprising:
locating an absorber in an elevator hoistway in operable communication with the guide rail of the elevator system, the absorber including an absorber housing, an absorber piston located in the absorber housing defining a housing chamber containing a volume of fluid; and
transmitting vertically-acting loads from the guide rail to the absorber via the absorber piston thereby increasing a fluid pressure in the housing chamber;
wherein the guide rail rests at a piston upper surface of the absorber piston.

13. The method of claim 12, further comprising:
periodically release fluid from the housing chamber via opening of a pressure relief valve; and
thereby reducing a stroke of the absorber piston in the absorber housing.

14. The method of claim 13, wherein the fluid is released from the housing chamber via opening of the pressure relief valve when a fluid pressure in the housing chamber exceeds a first threshold.

15. The method of claim 14, wherein the pressure relief valve is closed when the fluid pressure in the housing chamber falls below a second threshold.

16. The method of claim 15, wherein the first threshold is substantially equal to the second threshold.

* * * * *